(12) United States Patent
Araki

(10) Patent No.: US 10,811,183 B2
(45) Date of Patent: Oct. 20, 2020

(54) COIL COMPONENT

(71) Applicant: Murata Manufacturing Co., Ltd., Kyoto-fu (JP)

(72) Inventor: Kenichi Araki, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 236 days.

(21) Appl. No.: 15/820,059

(22) Filed: Nov. 21, 2017

(65) Prior Publication Data

US 2018/0144859 A1 May 24, 2018

(30) Foreign Application Priority Data

Nov. 24, 2016 (JP) ................................. 2016-228242

(51) Int. Cl.
| | |
|---|---|
| *H01F 27/29* | (2006.01) |
| *H01F 27/28* | (2006.01) |
| *H01F 1/147* | (2006.01) |
| *H01F 17/04* | (2006.01) |
| *H01F 27/255* | (2006.01) |

(52) U.S. Cl.
CPC ......... *H01F 27/2828* (2013.01); *H01F 1/147* (2013.01); *H01F 17/04* (2013.01); *H01F 27/255* (2013.01); *H01F 27/2852* (2013.01); *H01F 27/29* (2013.01); *H01F 27/292* (2013.01); *H01F 27/2804* (2013.01); *H01F 2017/048* (2013.01)

(58) Field of Classification Search
CPC .............................. H01F 5/00; H01F 27/00–40
USPC ............ 336/65, 83, 192, 200, 206–208, 232
See application file for complete search history.

(56) References Cited

U.S. PATENT DOCUMENTS

| | | | | |
|---|---|---|---|---|
| 10,242,789 | B2 * | 3/2019 | Maki | .................... H01F 27/2804 |
| 2010/0259353 | A1 * | 10/2010 | Saito | ..................... H01F 27/292 |
| | | | | 336/205 |
| 2014/0062639 | A1 * | 3/2014 | Sasamori | ................ H01F 17/04 |
| | | | | 336/175 |

(Continued)

FOREIGN PATENT DOCUMENTS

| | | |
|---|---|---|
| JP | 2011-199098 A | 10/2011 |
| JP | 2015-26812 A | 2/2015 |
| JP | 2016-9858 A | 1/2016 |

(Continued)

OTHER PUBLICATIONS

An Office Action; "Notification of Reasons for Refusal," Mailed by the Japanese Patent Office dated Aug. 27, 2019, which corresponds to Japanese Patent Application No. 2016-228242 and is related to U.S. Appl. No. 15/820,059; with English language translation.

(Continued)

*Primary Examiner* — Tuyen T Nguyen
(74) *Attorney, Agent, or Firm* — Studebaker & Brackett PC

(57) ABSTRACT

The coil component includes a magnetic body containing a metallic material and a resin material, a coil conductor embedded in the magnetic body, and a pair of outer electrodes electrically connected to ends of the coil conductor. The coil conductor includes an exposed portion at each end portion of the coil conductor, and a covered portion covered with an insulating substance disposed between the exposed portions. The covered portion is disposed inside a face of the magnetic body on which the outer electrodes are disposed.

15 Claims, 4 Drawing Sheets

(56) References Cited

U.S. PATENT DOCUMENTS

2016/0343501 A1* 11/2016 Suzuki ............... H01F 27/2828

FOREIGN PATENT DOCUMENTS

| JP | 2016-58418 A | 4/2016 |
| WO | 2015/115318 A1 | 8/2015 |

OTHER PUBLICATIONS

An Office Action; "Notification of Reasons for Refusal," mailed by the Japanese Patent Office dated Feb. 19, 2019, which corresponds to Japanese Patent Application No. 2016-228242 and is related to U.S. Appl. No. 15/820,059; with English language translation.

* cited by examiner

COIL COMPONENT

CROSS-REFERENCE TO RELATED APPLICATIONS

This application claims benefit of priority to Japanese Patent Application No. 2016-228242, filed Nov. 24, 2016, the entire content of which is incorporated herein by reference.

TECHNICAL FIELD

The present disclosure relates to a coil component and more particularly to a coil component that includes a magnetic body and a coil conductor embedded in the magnetic body.

BACKGROUND

In recent years, with an increase in the performance and a decrease in the size of electronic equipment, there has been a demand for smaller electronic components for use in electronic equipment. Coil components, such as inductors, are not exceptions and are also being decreased in size by various means.

For example, in order to decrease the electrical resistance of a lead end of a coil conductor and an external terminal electrode, the thickness of a conducting wire has hitherto been increased to increase the contact area between the lead end of the coil conductor and the external terminal electrode. In this method, however, a coil component is disadvantageously increased in size in order to achieve the desired inductance. To address the problem, International Publication WO 2015/115318 discloses a coil component that includes a coil conductor embedded in a compact formed of a composite material containing a magnetic material powder and a resin, wherein a lead end of the coil conductor is obliquely cut to increase the contact area of an external terminal electrode.

In such a coil component including a magnetic body formed of a composite material containing a metallic material and a resin material, an outer electrode is generally formed by applying a silver paste containing a thermosetting resin to the magnetic body by dip coating. In such a method, however, the resin between silver particles disadvantageously increases the electrical resistance of the outer electrode and decreases product efficiency. Furthermore, the formation of a thick silver film increases the cost.

To address these problems, an outer electrode can be formed by direct plating on a magnetic body. A magnetic body formed of a composite material containing a metallic material and a resin material has a relatively low specific resistance, and therefore a wire for a coil conductor is covered, for example, with an insulating resin to ensure insulation from an inner coil conductor. In the formation of an outer electrode by plating, as described above, particularly in the formation of an outer electrode by barrel plating, in order to provide the outer electrode with good characteristics, it is needed to ensure electrical continuity between both end faces of a magnetic body via a coil conductor in a short time after the beginning of plating. More specifically, a magnetic body should be electrically connected to a coil conductor in a short time over an insulating film surrounding the coil conductor. A delay in connection may result in a change in the surface oxidation state of a magnetic body or deposition of impurities on a magnetic body, reduce electricity supply from a medium, cause variations in plating thickness between coil components, or increase the specific resistance of an outer electrode.

SUMMARY

Thus, it is an object of the present disclosure to provide a coil component that includes a coil conductor embedded in a magnetic body containing a metallic material and a resin material, wherein the coil component includes an outer electrode with good characteristics.

As a result of extensive studies to solve the problems, the present inventor has arrived at the present disclosure by finding that, in a coil component that includes a coil conductor embedded in a magnetic body containing a metallic material and a resin material, an outer electrode can be provided with good characteristics by removing an insulating film at an end portion of the coil conductor to expose the coil conductor and thereby ensuring electrical continuity between the coil conductor and the magnetic body in a short time after the beginning of plating treatment.

According to a first aspect of the present disclosure, there is provided a coil component that includes a magnetic body containing a metallic material and a resin material, a coil conductor embedded in the magnetic body, and a pair of outer electrodes electrically connected to ends of the coil conductor. The coil conductor includes an exposed portion at each end portion thereof and a covered portion covered with an insulating substance disposed between the exposed portions. The covered portion is disposed inside a face of the magnetic body on which the outer electrodes are disposed.

According to a second aspect of the present disclosure, there is provided a method for producing a coil component that includes a magnetic body containing a metallic material and a resin material, a coil conductor embedded in the magnetic body, and a pair of outer electrodes electrically connected to ends of the coil conductor. The method includes treating a peripheral portion of the coil conductor by laser irradiation, the peripheral portion being exposed at a surface of the magnetic body, and then forming the outer electrodes by plating treatment.

The present disclosure can provide a coil component that includes a magnetic body containing a metallic material and a resin material, a coil conductor embedded in the magnetic body, and a pair of outer electrodes electrically connected to the coil conductor. An end portion of a lead portion of the coil conductor comes out from an insulating substance film, and at least part of the exposed portion is disposed inside the magnetic body. Thus, the outer electrodes have low resistance and little variation in thickness.

Other features, elements, characteristics and advantages of the present disclosure will become more apparent from the following detailed description of preferred embodiments of the present disclosure with reference to the attached drawings.

DETAILED DESCRIPTION OF EMBODIMENTS

Figure 1:
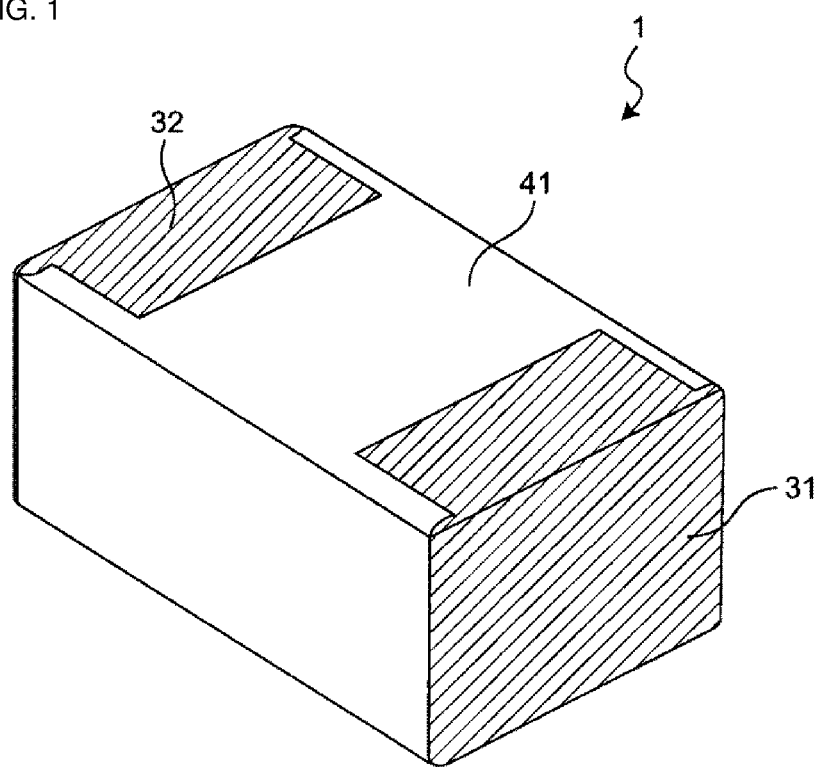
FIG. 1 is a schematic perspective view of an electronic component according to an embodiment of the present disclosure.

Coil components according to embodiments of the present disclosure will be described in detail below with reference to the accompanying drawings. However, the shape and arrangement of each coil component and each constituent according to the embodiments are not limited to those illustrated in the drawings.

Figure 2:
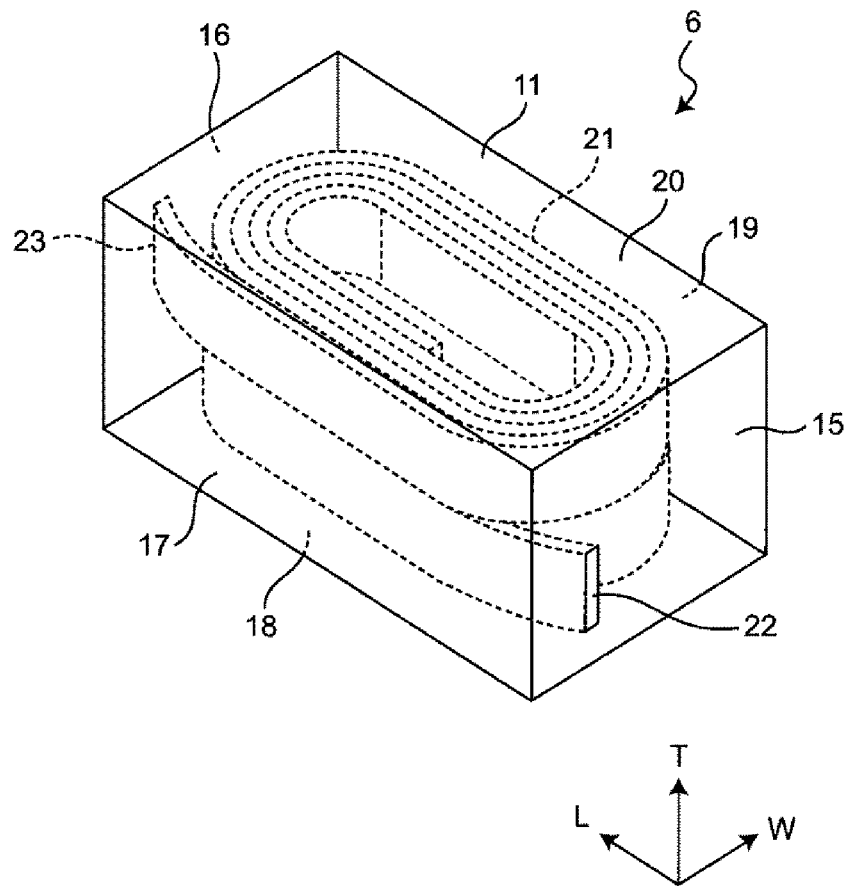
FIG. 2 is a perspective view of the electronic component illustrated in FIG. 1 without outer electrodes and an insulation film.

FIG. 1 is a schematic perspective view of a coil component 1 according to the present embodiment. FIG. 2 is a schematic perspective view of a body 6 of the coil component 1, exposed without the outer electrodes 31 and 32, and insulation film 41, as shown in FIG. 1.

As illustrated in FIGS. 1 and 2, the coil component 1 according to the present disclosure has a generally rectangular parallelepiped shape. Roughly speaking, as as illustrated specifically in FIG. 2, the coil component 1 includes a magnetic body 11, a coil conductor 21 embedded in the magnetic body 11, and outer electrodes 31 and 32. The magnetic body 11 and the coil conductor 21 embedded in the magnetic body 11 constitute the body 6. The body 6 has a generally rectangular parallelepiped shape, has two opposite end faces 15 and 16, and has a first side surface 17, a second side surface 18, a third side surface 19, and a fourth side surface 20 between the end faces 15 and 16. The outer electrodes 31 and 32, as shown by hatching in FIG. 1, are disposed on the end faces 15 and 16, respectively, and extend to a portion of the fourth side surface 20. Thus, the outer electrodes 31 and 32 have a substantially L-shaped cross section. One end 22 of the coil conductor 21 is electrically connected to the outer electrode 31, and the other end 23 is electrically connected to the outer electrode 32. As further shown in FIG. 1, an insulation film 41 is disposed in a region on the side surfaces of the body 6 where no outer electrode is disposed.

The magnetic body 11 contains a metallic material and a resin material. Preferably, the magnetic body 11 is formed of a composite material of a metallic material and a resin material.

The resin material may be, but is not limited to, an organic material, such as an epoxy resin, a phenolic resin, a polyester resin, a polyimide resin, or a polyolefin resin. The resin materials may be used alone or in combination.

The metallic material may be, but is not limited to, iron, cobalt, nickel, or gadolinium, or an alloy containing at least one thereof. Preferably, the metallic material is iron or an iron alloy. The iron alloy may be, but is not limited to, Fe—Si, Fe—Si—Cr, or Fe—Si—Al. The metallic materials may be used alone or in combination. The metallic material may contain at least one metal selected from palladium, silver, and copper, as well as the metal described above.

The metallic material is preferably a powder, that is, a metal powder. The metal powder may be a crystalline metal (or alloy) powder or an amorphous metal (or alloy) powder. The metal powder may be coated with an insulating substance. The insulating substance on the surface of the metal powder can increase the specific resistance of the magnetic body 11.

The metallic material content of the magnetic body 11 is preferably approximately 50% or more by volume, more preferably approximately 60% or more by volume, still more preferably approximately 70% or more by volume. A metallic material content in this range results in improved magnetic characteristics of a coil component according to an embodiment of the present disclosure. The metallic material content of the magnetic body 11 is preferably approximately 95% or less by volume, more preferably approximately 90% or less by volume, still more preferably approximately 87% or less by volume, still more preferably approximately 85% or less by volume. A metallic material content in this range results in an increased specific resistance of the magnetic body 11. In one embodiment, the metallic material content of the magnetic body 11 may preferably range from approximately 50% to 95% by volume, more preferably approximately 60% to 90% by volume, still more preferably approximately 70% to 87% by volume, still more preferably approximately 70% to 85% by volume.

The metal powder preferably has an average particle size of approximately 5 μm or more, more preferably approximately 10 μm or more. A metal powder having an average particle size of approximately 5 μm or more, particularly approximately 10 μm or more, is easy to treat. The metal powder preferably has an average particle size of approximately 100 μm or less, more preferably approximately 80 μm or less. A metal powder having an average particle size of approximately 100 μm or less, particularly approximately 80 μm or less, can have a high filling rate and improve the magnetic characteristics of the magnetic body 11. The term "average particle size," as used herein, refers to the average particle size D50 (the particle size at a cumulative percentage of 50% by volume). The average particle size D50 can be measured with a dynamic light scattering particle size analyzer (UPA manufactured by Nikkiso Co., Ltd.), for example. In one embodiment, the metal powder preferably has an average particle size in the range of approximately 5 to 100 μm, more preferably approximately 10 to 80 μm.

In one embodiment, the metal powder may contain at least two, for example, two, three, or four metal powders with different average particle sizes. The use of metal powders with different average particle sizes improves the magnetic characteristics of the magnetic body 11 and improves the adhesiveness of the outer electrodes 31 and 32 formed by plating. In one embodiment, the use of an iron or iron alloy powder and a metal powder with a smaller average particle size than the iron or iron alloy powder can improve the magnetic characteristics of the magnetic body 11.

At least part of the metallic material is preferably exposed at the surface of the magnetic body 11. The term "exposed," as used herein, refers to being exposed at the surface of the magnetic body 11 and also being exposed at an interface with another member. Thus, a metallic material exposed at the surface of the magnetic body 11 may be covered with another member, for example, the outer electrodes 31 and 32 or the insulation film 41, as discussed above. In a preferred embodiment, the ratio of the exposed area of the metallic material to the surface area of the magnetic body 11 may be approximately 20% or more, preferably approximately 30% or more. An increase in the exposed area results in an increase in the electrical conductivity of the surface of the magnetic body 11 and thereby makes plating treatment easier.

Figure 3:
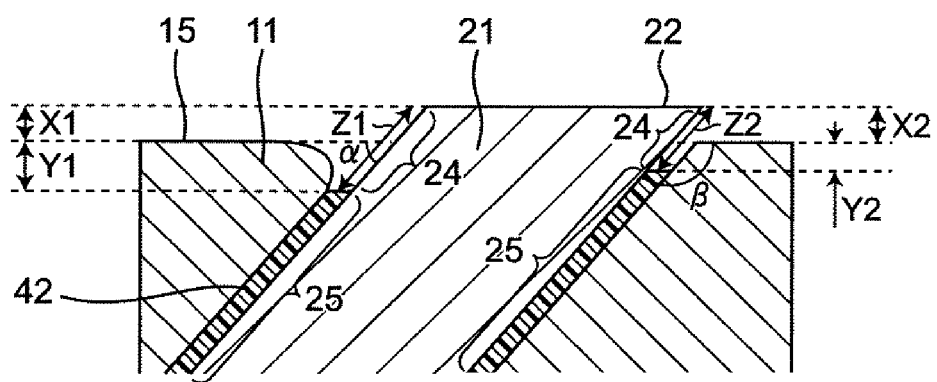
FIG. 3 is a schematic cross-sectional view of the body illustrated in FIG. 2 parallel to the LW-surface on the periphery of the coil conductor.
Figure 4:
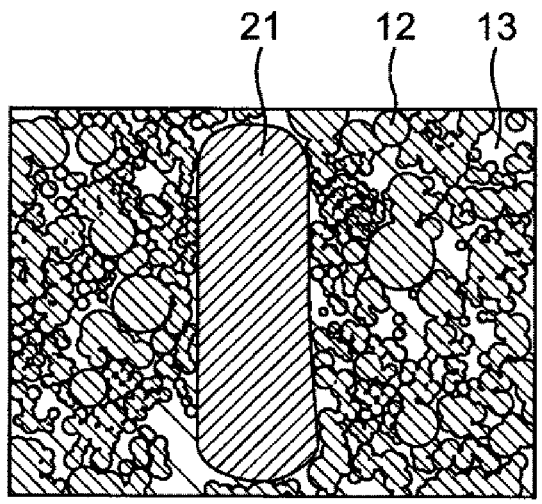
FIG. 4 is a schematic plan view of the periphery of the coil conductor on an end face.

The metallic material, typically a metal powder, preferably fuses and forms a network structure on the surface of the magnetic body 11. FIG. 3 is a schematic cross-sectional view of the body illustrated in FIG. 2 parallel to the LW-surface on the periphery of the coil conductor. FIG. 4 is a schematic plan view of the periphery of the coil conductor 21 on the end face 15. In FIG. 4, a metallic material 12 is exposed on the resin material 13 and forms a network structure. The network structure of the metallic material facilitates electric current supply in plating treatment and increases the plating deposition rate. In a preferred embodiment, the metallic material, typically a metal powder, melts once and fuses. This strengthens the network structure of the metallic material and makes plating treatment easier. This can also prevent the metallic material from separating from the magnetic body 11 by cutting or barreling.

Even when the network structure of the metallic material is disposed on the surface of the magnetic body 11, the magnetic body 11 includes no network structure therein. Thus, the interior of the magnetic body 11 can have insulating properties and maintain dielectric strength.

Figure 7A:
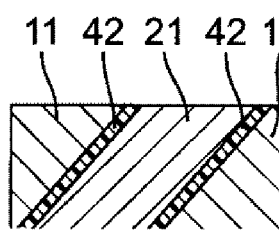
FIGS. 7A to 7D are schematic plan views of the periphery of the coil conductor after laser irradiation in an example.
Figure 7B:
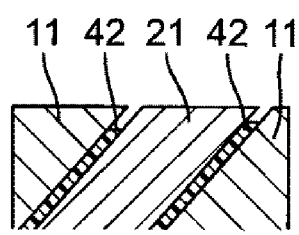
Figure 7C:
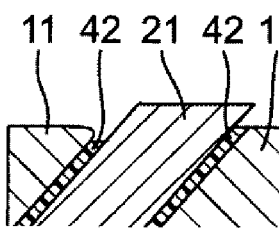
Figure 7D:
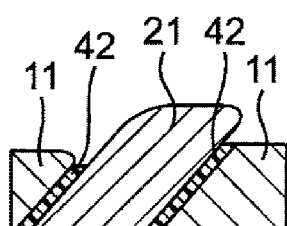

In one embodiment, a region on the surface of the magnetic body 11 adjacent to the coil conductor 21 may be removed (see the left side of the coil conductor 21 in FIGS. 7C and 7D, for example). The removal of the region of the magnetic body 11 adjacent to the coil conductor 21 increases the space between the magnetic body 11 and the coil conductor 21, facilitates the infiltration of a medium in barrel plating, and improves the plating deposition rate.

The coil conductor 21 is formed by winding a conducting wire containing an electrically conductive material. The electrically conductive material may be, but is not limited to, Au, Ag, Cu, Pd, or Ni. Preferably, the electrically conductive material is Cu. The electrically conductive materials may be used alone or in combination.

The shapes of the conducting wire and the coil conductor 21 are not limited to those illustrated in the figures and may be any shapes available for coil components. In the present embodiment, as illustrated in FIG. 2, the coil conductor 21 is wound as two layers such that the ends 22 and 23 are disposed outwardly. Thus, the coil conductor 21 is formed by winding a rectangular conducting wire outwardly in layers. The end 22 of the coil conductor 21 is exposed at the end face 15 of the body 6, and the other end 23 of the coil conductor 21 is exposed at the other end face 16 of the body 6.

The conducting wire of the coil conductor 21 is covered with an insulating film (the insulating film is not shown in FIG. 2). Typically, as illustrated in FIG. 3, an end portion of a lead portion of the coil conductor 21 to be connected to the outer electrodes 31 and 32 is exposed, and the other portion of the coil conductor 21 is covered with an insulating film 42. Thus, the coil conductor 21 is composed of an exposed portion 24 at each end portion thereof and a covered portion 25 between the exposed portions 24. The conducting wire of the coil conductor 21 covered with the insulating film 42 can ensure insulation between the coil conductor 21 and the magnetic body 11. The exposed end portions of the coil conductor 21 make plating treatment easier, thus resulting in an outer electrode with little variation in thickness. This can also reduce the resistance of the contact portions between the coil conductor 21 and the outer electrodes 31 and 32.

The insulating film 42 may be, but is not limited to, a film of a polyurethane resin, a polyester resin, an epoxy resin, or a polyamideimide resin. The insulating film 42 preferably has a thickness of approximately 0.5 µm or more, more preferably approximately 1.0 µm or more. The insulating film 42 having a thickness in this range can ensure insulation between the coil conductor 21 and the magnetic body 11. The insulating film 42 preferably has a thickness of approximately 20 µm or less, more preferably approximately 10 µm or less, still more preferably approximately 5.0 µm or less. The insulating film 42 with a thickness in this range can ensure a larger volume of the magnetic body 11 and improve the magnetic characteristics of the coil component 1. In one embodiment, the insulating film 42 may have a thickness in the range of approximately 0.5 to 20 µm, preferably approximately 1.0 to 10 µm, more preferably approximately 1.0 to 5.0 µm.

The average length of the exposed portion 24 at each end portion in the longitudinal direction of the conducting wire may preferably be approximately 1 µm or more, more preferably approximately 5 µm or more, still more preferably approximately 10 µm or more, still more preferably approximately 20 µm or more. An average length of the exposed portion 24 in this range can result in easier plating treatment, an improved plating deposition rate, and a reduced unplated area. This can also result in lower resistance of the contact portions between the coil conductor 21 and the outer electrodes 31 and 32. The exposed portion 24 may preferably have an average length of approximately 100 µm or less, more preferably approximately 70 µm or less, still more preferably approximately 50 µm or less. The exposed portion 24 with an average length in this range can reduce the area of the contact portions between the coil conductor 21 and the outer electrodes 31 and 32 within the magnetic body 11. Considering heat generation in the contact portions, a decrease in the area of the contact portions within the magnetic body 11 can reduce heat generation in the magnetic body 11. In one embodiment, the exposed portion 24 may have an average length in the range of approximately 1 to 100 µm, preferably approximately 5 to 70 µm, more preferably approximately 10 to 50 µm, still more preferably approximately 20 to 50 µm.

The phrase "the length of the exposed portion in the longitudinal direction of the conducting wire," as used herein, refers to the length from an end of the conducting wire in one end portion to the insulating film in the longitudinal direction of the conducting wire (for example, Z1 and Z2 in FIG. 3). The phrase "the average length of the exposed portion in the longitudinal direction of the conducting wire," as used herein, refers to the average length around the conducting wire.

The maximum length of the exposed portion 24 at each end portion in the longitudinal direction of the conducting wire may preferably be approximately 1 µm or more, more preferably approximately 5 µm or more, still more preferably approximately 10 µm or more, still more preferably approximately 20 µm or more, for example, approximately 40 µm or more. When the exposed portion 24 has a maximum length in this range, plating on the coil conductor 21 can be more quickly coupled to plating on the magnetic body 11 over the insulating film 42 in plating treatment. Thus, the plating layers at both end portions (the outer electrodes 31 and 32) are electrically connected to each other via the coil conductor 21, thereby improving the plating deposition rate. The exposed portion 24 may preferably have a maximum length of approximately 100 µm or less, more preferably approximately 80 µm or less, still more preferably approximately 60 µm or less. In one embodiment, the exposed portion 24 may preferably have a maximum length in the range of approximately 1 to 100 µm, more preferably approximately 5 to 80 µm, still more preferably approximately 10 to 60 µm, still more preferably approximately 20 to 60 µm, for example, approximately 40 to 60 µm. The phrase "the maximum length of the exposed portion in the longitudinal direction of the conducting wire," as used herein, refers to the length of the longest part of the exposed portion in the longitudinal direction of the conducting wire around the conducting wire.

The minimum length of the exposed portion 24 at each end portion in the longitudinal direction of the conducting wire may preferably be approximately more than 0 µm, more preferably approximately 1 µm or more, still more preferably approximately 5 µm or more, still more preferably approximately 10 µm or more, particularly preferably approximately 20 µm or more. A minimum length of the exposed portion 24 in this range results in an improved plating deposition rate. The exposed portion 24 may preferably have a minimum length of approximately 100 µm or less, more preferably approximately 70 µm or less, still more preferably approximately 50 µm or less. In one embodiment, the exposed portion 24 may preferably have a minimum length of more than approximately 0 µm and approximately 100 µm or less, more preferably approximately 1 to 70 µm, still more preferably approximately 5 to 50 µm, still more preferably approximately 10 to 50 µm, particularly preferably approximately 20 to 50 µm. The phrase "the minimum length of the exposed portion in the longitudinal direction of the conducting wire," as used herein, refers to the length of the shortest part of the exposed portion in the longitudinal direction of the conducting wire around the conducting wire.

The covered portion of the coil conductor 21 is disposed inside the faces of the magnetic body 11 on which the outer electrodes 31 and 32 are disposed, that is, the end faces 15 and 16. In other words, the exposed portions 24 of the coil conductor 21 extend to the inside of the end faces 15 and 16.

The average depth of each of the exposed portions 24 from the end faces 15 and 16 may preferably be approximately 1 µm or more, more preferably approximately 5 µm or more, still more preferably approximately 8 µm or more, still more preferably approximately 10 µm or more, particularly preferably approximately 20 µm or more. An average depth in this range can result in easier plating treatment, an improved plating rate, and a reduced unplated area. This can also reduce the resistance of the contact portions between the coil conductor 21 and the outer electrodes 31 and 32. The average depth may preferably be approximately 80 µm or less, more preferably approximately 50 µm or less, still more preferably approximately 35 µm or less. An average depth in this range can result in improved dissipation of heat generated in the contact portions between the coil conductor 21 and the outer electrodes 31 and 32. In one embodiment, the average depth may preferably range from approximately 1 to 80 µm, more preferably approximately 5 to 50 µm, still more preferably approximately 8 to 35 µm, still more preferably approximately 10 to 35 µm, particularly preferably approximately 20 to 35 µm.

The phrase "the depth of the exposed portion from the end face," as used herein, refers to the depth in a direction perpendicular to the end face (for example, Y1 and Y2 in FIG. 3). The reference position of the end face is the average height of a straight line between an edge of the exposed coil conductor on the end face and the nearest edge of the end face (the contact portions between the end faces 15 and 16 and the first to fourth side surfaces 17 to 20 in FIG. 2) (except the portion 50 µm in length from an edge of the coil conductor). The phrase "the average depth of the exposed portion from the end face," as used herein, refers to the average depth of the exposed portion around the conducting wire.

The maximum depth of each of the exposed portions 24 from the end faces 15 and 16 may preferably be approximately 1 µm or more, more preferably approximately 5 µm or more, still more preferably approximately 8 µm or more, still more preferably approximately 10 µm or more, particularly preferably approximately 20 µm or more. A maximum depth in this range results in an improved plating rate. The maximum depth may preferably be approximately 80 µm or less, more preferably approximately 50 µm or less, still more preferably approximately 40 µm or less. A maximum depth in this range can result in less heat generation in the contact portions between the coil conductor 21 and the outer electrodes 31 and 32. In one embodiment, the maximum depth may preferably range from approximately 1 to 80 µm, more preferably approximately 5 to 50 µm, still more preferably approximately 8 to 40 µm, still more preferably approximately 10 to 40 µm, particularly preferably approximately 20 to 40 µm. The phrase "the maximum depth of the exposed portion from the end face," as used herein, refers to the depth of the deepest portion around the conducting wire.

The minimum depth of each of the exposed portions 24 from the end faces 15 and 16 may preferably be more than approximately 0 µm, more preferably approximately 3 µm or more, still more preferably approximately 5 µm or more, still more preferably approximately 7 µm or more, still more preferably approximately 10 µm or more. A minimum depth in this range results in easier plating treatment and an improved plating deposition rate. This can also reduce the resistance of the contact portions between the coil conductor 21 and the outer electrodes 31 and 32. The minimum depth may preferably be approximately 80 µm or less, more preferably approximately 50 µm or less, still more preferably approximately 30 µm or less. A minimum depth in this range can result in improved dissipation of heat generated in the contact portions between the coil conductor 21 and the outer electrodes 31 and 32. In one embodiment, the minimum depth may preferably be more than approximately 0 µm and approximately 80 µm or less, more preferably approximately 3 to 50 µm, still more preferably approximately 5 to 30 µm, still more preferably approximately 7 to 30 µm, particularly preferably approximately 10 to 30 µm. The phrase "the minimum depth of the exposed portion from the end face," as used herein, refers to the depth of the shallowest portion around the conducting wire.

The cross sections of the ends 22 and 23 of the coil conductor 21 are preferably flush with or disposed outside the faces of the magnetic body 11 on which the outer electrodes 31 and 32 are disposed, that is, the end faces 15 and 16. More preferably, the cross sections of the ends 22 and 23 of the coil conductor 21 are disposed outside the faces of the magnetic body 11 on which the outer electrodes 31 and 32 are disposed. In other words, the ends 22 and 23 of the coil conductor 21 protrude from the end faces 15 and 16.

The average protrusion height of each of the ends of the coil conductor 21 from the end faces 15 and 16 may preferably be approximately 0 µm or more, more preferably approximately 1 µm or more, still more preferably approximately 5 µm or more, still more preferably approximately 10 µm or more, for example, approximately 15 µm or more. For an average protrusion height in this range, the contact portions between the coil conductor 21 and the outer electrodes 31 and 32 can be disposed outside the body. Thus, heat generated in the contact portions can be more easily dissipated. This also improves the plating deposition rate. The average protrusion height may preferably be approximately 80 µm or less, more preferably approximately 50 µm or less, still more preferably approximately 30 µm or less, still more preferably approximately 20 µm or less. For an average protrusion height in this range, the outer electrodes 31 and 32 can be more easily flattened. In one embodiment, the average protrusion height may preferably range from approximately 0 to 80 µm, more preferably approximately 1 to 50 µm, still more preferably approximately 5 to 30 µm, still more preferably approximately 10 to 20 µm, for example, approximately 15 to 20 µm.

The phrase "the protrusion height of the end of the coil conductor from the end face," as used herein, refers to the protrusion height in a direction perpendicular to the end face (for example, X1 and X2 in FIG. 3). The reference position of the end face is defined in the same manner as in the depth of the exposed portion from the end face. The phrase "the average protrusion height of the end of the coil conductor from the end face," as used herein, refers to the average protrusion height around the conducting wire.

The maximum protrusion height of each of the ends of the coil conductor 21 from the end faces 15 and 16 may preferably be approximately 1 µm or more, more preferably approximately 5 µm or more, still more preferably approximately 10 µm or more, for example, approximately 15 µm or more. A maximum protrusion height in this range results in improved heat dissipation and an improved plating deposition rate. The maximum protrusion height may preferably be approximately 80 µm or less, more preferably approximately 50 µm or less, still more preferably approximately 30 µm or less, still more preferably approximately 20 µm or less. For a maximum protrusion height in this range, the outer electrodes 31 and 32 can be more easily flattened. In one embodiment, the maximum protrusion height may preferably range from approximately 1 to 80 µm, more preferably approximately 5 to 50 µm, still more preferably approximately 10 to 30 µm, for example, approximately 15 to 20 µm. The phrase "the maximum protrusion height of the end of the coil conductor from the end face," as used herein, refers to the height of the highest portion around the conducting wire.

The minimum protrusion height of each of the ends of the coil conductor 21 from the end faces 15 and 16 may preferably be more than approximately 0 µm, more preferably approximately 1 µm or more, still more preferably approximately 3 µm or more, still more preferably approximately 5 µm or more, particularly preferably approximately 7 µm or more, particularly more preferably approximately 10 µm or more. A minimum protrusion height in this range results in an improved plating deposition rate. The minimum protrusion height may preferably be approximately 60 µm or less, more preferably approximately 40 µm or less, still more preferably approximately 30 µm or less, still more preferably approximately 20 µm or less. In one embodiment, the minimum protrusion height may preferably be more than approximately 0 µm and approximately 60 µm or less, more preferably approximately 1 to 40 µm, still more preferably approximately 3 to 30 µm, still more preferably approximately 5 to 20 µm, particularly preferably approximately 7 to 20 µm, particularly more preferably approximately 10 to 20 µm. The phrase "the minimum protrusion height of the end of the coil conductor from the end face," as used herein, refers to the height of the lowest portion around the conducting wire.

In one embodiment, the coil conductor 21 may have a round end portion (see FIG. 7D). The coil conductor 21 with a round end portion increases the space between the magnetic body 11 and the coil conductor 21, facilitates the infiltration of a medium in barrel plating, and improves the plating deposition rate.

In the present embodiment, the coil conductor 21 has oblique ends 22 and 23. In other words, the angle of each cross section of the ends 22 and 23 of the coil conductor 21 to the central axis of the conducting wire of the coil conductor 21 is less than approximately 90 degrees. The phrase "the angle of the cross section of the end of the coil conductor to the central axis of the conducting wire of the coil conductor," as used herein, refers to the minimum angle between the cross section and the central axis.

The angle is preferably approximately 30 degrees or more, more preferably approximately 40 degrees or more, still more preferably approximately 50 degrees or more. The angle can be increased to reduce the area behind the coil conductor 21 during the removal of the insulating film 42 from the conducting wire by laser irradiation, thus making the removal easier. The angle is preferably approximately 80 degrees or less, more preferably approximately 70 degrees or less, still more preferably approximately 60 degrees or less. The angle can be decreased to increase the cross-sectional area at each end of the coil conductor 21, thus making plating easier and reducing the unplated area. This can also increase the contact areas between the coil conductor 21 and the outer electrodes 31 and 32 and decrease resistance in the contact portions. In one embodiment, the angle preferably ranges from approximately 30 to 80 degrees, more preferably approximately 40 to 70 degrees, still more preferably approximately 50 to 60 degrees. In the present disclosure, the coil conductor does not necessarily have an oblique end and may have a cross section perpendicular to the central axis.

For the coil conductor 21 with an oblique end, in a section of the coil component 1 in the longitudinal direction of the conducting wire of the coil conductor 21 (for example, a section parallel to the LW-surface in FIG. 2), the angle between a surface (outer surface) of the magnetic body 11 and the coil conductor 21 of the magnetic body 11 (for example, the angles α and β in FIG. 3) varies from an obtuse angle to an acute angle depending on the section. Preferably, the magnetic body 11 is more easily removed in a region with an acute angle (for example, the angle α in FIG. 3) than in a region with an obtuse angle (for example, the angle β in FIG. 3) on the surface of the magnetic body 11 adjacent to the coil conductor 21. Preferably, the coil conductor 21 has a more round end portion in the region with an acute angle than in the region with an obtuse angle.

The outer electrodes 31 and 32 are disposed on the outer surface of the body 6. Preferably, the outer electrodes 31 and 32 are formed by plating treatment. The outer electrodes 31 and 32 may be monolayer or multilayer. The outer electrodes 31 and 32 are formed of an electrically conductive material, preferably at least one metallic material selected from Au, Ag, Pd, Ni, and Cu.

In the present embodiment, the outer electrodes 31 and 32 are disposed on the end faces 15 and 16, respectively, and extend to a portion of the fourth side surface 20. The outer electrode 31 is electrically connected to the end 22 of the coil conductor 21, and the outer electrode 32 is electrically connected to the end 23 of the coil conductor 21. The outer electrodes 31 and 32 may have any thickness, for example, in the range of approximately 1 to 20 µm, preferably approximately 5 to 10 µm.

In the present embodiment, the insulation film 41 is disposed in a region on the outer surface of the body 6 where the outer electrodes 31 and 32 are not disposed. The insulation film 41 may be formed of an insulating resin material, such as an acrylic resin, an epoxy resin, or polyimide. In the present disclosure, an insulation film is not essential and may be omitted.

A method for producing the coil component 1 will be described below.

The body 6 is produced. The body 6 can be produced by placing the coil conductor 21 in the magnetic body 11. For example, the body 6 can be produced as described below.

The coil conductors 21 are placed in a mold. A sheet of a composite material containing a metallic material and a resin material is then placed on the coil conductors 21 and is subjected to first press forming. At least part of the coil conductors 21 is embedded in the sheet by the first press forming. The coil conductors 21 are filled with the composite material.

The sheet including the coil conductors 21 after the first press forming is removed from the mold. Another sheet is then placed on a bare surface of the coil conductors 21 and is subjected to secondary pressing. Thus, a coil assembly substrate including the bodies 6 is produced. The two sheets are integrated by the secondary pressing and constitute the magnetic body 11 of the coil component 1.

The coil assembly substrate formed by the secondary press forming was divided into the bodies 6. The ends 22 and 23 of the coil conductor 21 are exposed at the opposite end faces 15 and 16 of each of the bodies 6.

The coil assembly substrate can be divided into the bodies 6 with a dicing blade, a laser apparatus, a dicer, a cutting tool, or a mold. In a preferred embodiment, the cut surfaces of the bodies 6 are subjected to barrel polishing.

A method for producing the body 6 of the coil component 1 according to an embodiment of the present disclosure has been described. However, the body 6 can be produced not only by this method but also by any method by which a body including a coil conductor in a magnetic body can be produced. For example, a coil conductor paste and a metal powder paste are repeatedly applied by screen printing to form a block, and the block is divided into pieces and fired. Alternatively, a coil conductor may be embedded in a core of a composite material.

The outer electrodes 31 and 32 are then formed by plating treatment, preferably electroplating treatment, on the end faces 15 and 16 at which the ends 22 and 23 of the coil conductor 21 are exposed. The ends 22 and 23 of the coil conductor 21 are electrically connected to the outer electrodes 31 and 32, respectively. Thus, a coil component according to an embodiment of the present disclosure is produced.

A plating treatment will be described in detail below.

The insulation film 41 is formed on the outer surface of the body 6. A portion of the insulation film 41 in the regions on the outer surface of the body 6 in which the outer electrodes 31 and 32 are to be formed is then removed. Methods for forming and removing the insulation film 41 can be known methods. For example, the insulation film 41 can be formed by spraying or dipping.

A peripheral portion of the coil conductor 21 exposed at the surface of the magnetic body 11 is then irradiated with a laser beam. Thus, the insulating film 42 is removed from the end portions of the coil conductor 21 to form the exposed portions 24 extending to the inside of the end faces 15 and 16 of the magnetic body 11.

Thus, the present disclosure also provides a method for producing a coil component that includes a magnetic body containing a metallic material and a resin material, a coil conductor embedded in the magnetic body, and a pair of outer electrodes electrically connected to ends of the coil conductor. The method includes treating a peripheral portion of the coil conductor by laser irradiation, the peripheral portion being exposed at a surface of the magnetic body, and then forming the outer electrodes by plating treatment.

In a preferred embodiment, laser irradiation is performed in the entire region of the outer surface of the body 6 in which the outer electrodes 31 and 32 are to be formed. The insulation film 41 in the regions of the outer surface of the body 6 in which the outer electrodes 31 and 32 are to be formed may be simultaneously removed by the irradiation.

At least part of the resin material of the magnetic body 11 is removed from the laser-irradiated surface of the magnetic body 11, and at least part of the metallic material (typically a metal powder) can fuse. Thus, the metallic material can form a network structure on the surface of the magnetic body 11. The intensity of laser irradiation can be controlled to melt and fuse the metallic material (typically a metal powder) on the surface of the magnetic body 11.

Even when the metallic material forms a network structure on the surface of the magnetic body 11 by laser irradiation, no network structure is formed within the magnetic body 11. Thus, the interior of the magnetic body 11 can have insulating properties and maintain dielectric strength.

The laser-irradiated surface of the magnetic body 11, from which the resin material and the metallic material are removed, may be depressed by laser irradiation. Thus, the ends 22 and 23 of the coil conductor 21 may protrude from the surface of the magnetic body 11.

In a preferred embodiment, a region on the surface of the magnetic body 11 adjacent to the coil conductor 21 may be removed by laser irradiation. The coil conductor 21 may have a round end portion due to laser irradiation.

The laser wavelength in the laser irradiation ranges from approximately 180 to 3000 nm, for example. The laser wavelength preferably ranges from approximately 532 to 1064 nm. Laser irradiation with a laser wavelength in this range can remove an insulating film from a coil conductor with less damage to a body and thereby increase the plating rate. The laser wavelength is determined in consideration of damage to a body and a reduction in processing time. The laser radiation energy is preferably approximately 0.20 $J/mm^2$ or more, more preferably approximately 0.35 $J/mm^2$ or more, still more preferably approximately 0.45 $J/mm^2$ or more, still more preferably approximately 0.50 $J/mm^2$ or more, for example, approximately 0.60 $J/mm^2$ or more. Laser radiation energy in this range results in more efficient removal of an insulating film and a resin material of a magnetic body and better formation of a network structure of a metallic material of a magnetic body. The laser radiation energy may preferably be approximately 3.0 $J/mm^2$ or less, more preferably approximately 2.0 $J/mm^2$ or less, still more preferably approximately 1.5 $J/mm^2$ or less, for example, approximately 1.0 $J/mm^2$ or less. Laser radiation energy in this range can have less damage to a body. In one embodiment, the laser radiation energy may preferably range from approximately 0.20 to 3.0 $J/mm^2$, more preferably approximately 0.35 to 2.0 $J/mm^2$, still more preferably approximately 0.45 to 1.5 $J/mm^2$, still more preferably approximately 0.50 to 1.0 $J/mm^2$, particularly preferably approximately 0.60 to 1.0 $J/mm^2$.

In one embodiment, the surfaces to be irradiated with a laser beam are the end faces 15 and 16 of the body 6 on which the insulation film 41 is formed, a portion of the fourth side surface 20 adjacent to the end face 15, and a portion of the fourth side surface 20 adjacent to the end face 16. The insulation film 41 is removed from the laser-irradiated regions. The insulating film 42 at the end portions of the coil conductor 21 is also removed. The resin material on the surface of the magnetic body 11 may be removed from the laser-irradiated surface, thereby exposing the metallic material. The insulation film 41, the resin material on the surface of the magnetic body 11, and the insulating film 42 at the ends of the coil conductor 21 may be removed by laser irradiation.

The outer electrodes 31 and 32 (plating layers) are then formed by plating on the laser-irradiated surface of the body 6. More specifically, the outer electrode 31 is continuously formed on the end face 15 and a portion of the fourth side surface 20 adjacent to the end face 15, and the outer electrode 32 is continuously formed on the end face 16 and a portion of the fourth side surface 20 adjacent to the end face 16.

In the plating treatment of the body 6, a plating layer is deposited on the exposed metallic material and the exposed portions of the coil conductor 21 and gradually cover the entire laser-irradiated surface, thereby forming the substantially L-shaped outer electrodes 31 and 32. A plating catalyst may be applied to the laser-irradiated surface of the body 6 before plating treatment to form a plating film. The plating catalyst is a metal that improves the deposition rate of a plating layer, for example, a metal solution or a nanoscale metal powder or metal complex.

The plating metal may be of any type, for example, Au, Ag, Pd, Ni, or Cu, preferably Pd, Ag, or Cu. In the case where the outer electrodes 31 and 32 are multilayer, for example, a Ni plating layer and a Sn plating layer are preferably formed on the plating layer. The plating method is preferably, but not limited to, barrel plating.

In the present disclosure, no insulating film is disposed between the magnetic body 11 and the coil conductor 21 in the surface portion of the body 6. Thus, the magnetic body 11 is electrically connected to the coil conductor 21 via the plating layer in a short time after the beginning of plating treatment. Thus, the plating layers on the end faces 15 and 16 of the body 6 are electrically connected to each other via the coil conductor 21. This improves the plating deposition rate and reduces variations in plating deposition rate on the end faces 15 and 16. In particular, at least part of the metallic material in the plating portion that fuses to form a network structure facilitates electric current supply and improves the deposition rate of the plating layer.

Although the coil components and the methods for producing the coil components according to the embodiments of the present disclosure are described above, the present disclosure is not limited to these embodiments, and these embodiments may be modified without departing from the gist of the present disclosure. For example, although the coil conductor 21 of the coil component 1 is disposed such that the central axis of the coil conductor 21 is perpendicular to the end faces 15 and 16, the coil conductor 21 of the coil component 1 may be disposed such that the central axis of the coil conductor 21 is parallel to the end faces 15 and 16.

A portion on the end face 15 of the outer electrode 31 and a portion on the end face 16 of the outer electrode 32 may be covered with the insulation film 41, and only portions of the outer electrodes 31 and 32 on the fourth side surface 20 may be exposed. Thus, the substantially L-shaped outer electrodes 31 and 32 may be outer electrodes on one surface (bottom electrodes).

EXAMPLES

Fe—Si was prepared as a metal powder, and a composite sheet containing an epoxy resin was prepared as a resin material. α-coiled conductors (coil conductors formed by winding a rectangular conducting wire outwardly in two layers) made of copper were prepared. Each of the α-coiled conductors was covered with a polyurethane resin serving as an insulating material.

The α-coiled conductors were then placed on a mold. The composite sheet was placed on the α-coiled conductors and was pressed for approximately 30 minutes at a pressure of approximately 5 MPa and at a temperature of approximately 150° C.

The composite sheet combined with the coil conductors was then removed from the mold. Another composite sheet was placed on the surface at which the coil conductors were exposed, and was pressed for approximately 30 minutes at a pressure of approximately 5 MPa and at a temperature of approximately 150° C. to form a coil assembly substrate including the coil conductors.

The coil assembly substrate was divided into bodies with a dicing blade. The bodies were subjected to barrel polishing. The ends of the coil conductors were exposed at the opposite side surfaces (end faces) of the bodies.

Figure 5:
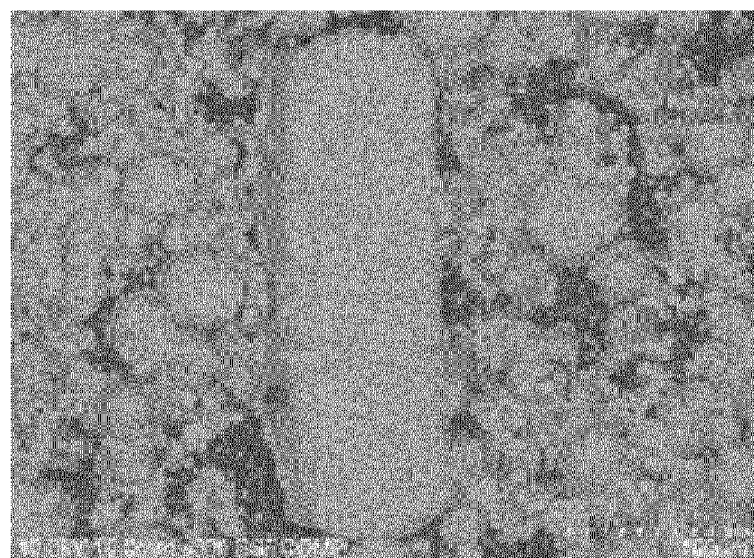
FIG. 5 is a SEM image of a laser-irradiated body surface in an example.
Figure 6:
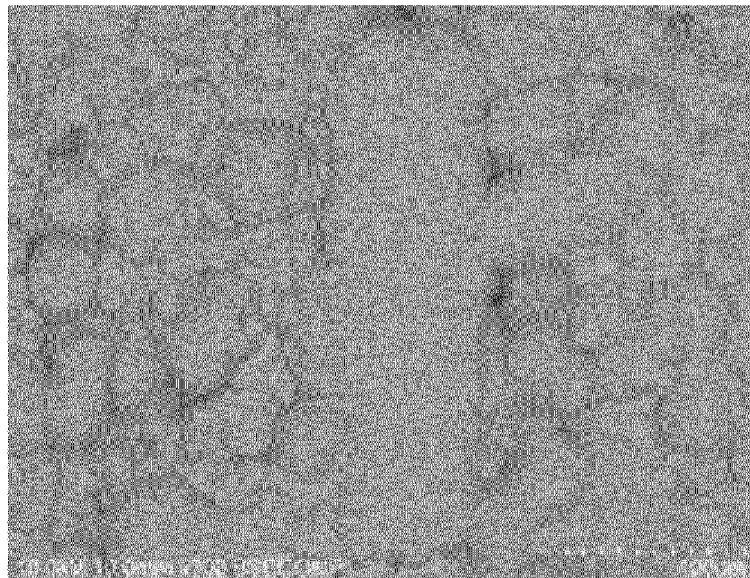
FIG. 6 is a SEM image of a laser-irradiated body surface in an example.

The areas of the body in which outer electrodes were to be formed were then irradiated with a laser beam. The laser was a YVO$_4$ laser (wavelength: approximately 532 nm), and the radiation energy was approximately 0.25, 0.36, 0.46, 0.56, or 0.68 J/mm$^2$. After laser irradiation, observations of the irradiated surface with a scanning electron microscope (SEM) showed that the insulating layer on the surface of the body was removed, and the metal powder was exposed on the resin material, melted, and fused to form a network structure. FIG. 5 (approximately 0.25 J/mm$^2$) and FIG. 6 (approximately 0.68 J/mm$^2$) show laser-irradiated body surfaces.

Cu plating was then performed for approximately 180 minutes with a barrel electroplating apparatus at a current value of approximately 15 A and at a temperature of approximately 55° C. to form outer electrodes on the laser-irradiated surfaces. Thus, a coil component according to an embodiment of the present disclosure was produced.

Evaluation

Cross-Sectional Shape of Periphery of Conductor

The coil components thus produced were stood such that the LW-surfaces were exposed, and were enclosed with a resin. The LW-surfaces were polished with a polisher up to almost the center of an end of the coil conductor. The cross-sectional shape of the periphery of the conductor was observed with the scanning electron microscope. As illustrated in FIG. 3, the protrusion height X1 from the end face and the depth Y1 of the exposed portion from the end face were measured on the side on which the angle between the surface (outer surface) of the magnetic body and the coil conductor was an acute angle (on the angle α side in FIG. 3). Likewise, the protrusion height X2 from the end face and the depth Y2 of the exposed portion from the end face were measured on the side on which the angle between the surface of the magnetic body and the coil conductor was an obtuse angle (the angle β side in FIG. 3). Table 1 lists the average values of ten of the coil components for each radiation energy. The sample number 1 is a comparative example.

TABLE 1

| Sample No. | Radiation energy (J/mm$^2$) | X1 (μm) | Y1 (μm) | X2 (μm) | Y2 (μm) |
|---|---|---|---|---|---|
| *1 | 0 | 0 | 0 | 0 | 0 |
| 2 | 0.25 | 0 | 6 | 0 | 3 |
| 3 | 0.36 | 0 | 9 | 0 | 5 |

TABLE 1-continued

| Sample No. | Radiation energy (J/mm$^2$) | X1 (μm) | Y1 (μm) | X2 (μm) | Y2 (μm) |
|---|---|---|---|---|---|
| 4 | 0.46 | 5 | 10 | 3 | 7 |
| 5 | 0.56 | 10 | 20 | 6 | 11 |
| 6 | 0.68 | 15 | 30 | 9 | 15 |

Table 1 shows that in the sample number 1 (no laser irradiation) the insulating film was not removed, and the insulating film and the end of the coil conductor had the same height (FIG. 7A). In the sample numbers 2 and 3 (approximately 0.25 and 0.36 J/mm$^2$), although the insulating film was removed at the end portion of the coil conductor, thereby forming an exposed portion, the end face of the magnetic body and the end of the coil conductor had the same height (FIG. 7B). In the sample number 4 (approximately 0.46 J/mm$^2$), the insulating film was removed at the end portion of the coil conductor, thereby forming an exposed portion, and the end of the coil conductor was higher than the end face of the magnetic body (FIG. 7C). In the sample numbers 5 and 6, the coil conductor had a round end (FIG. 7D).

Deposition of Plating

For each radiation energy, the appearances of 100 of the coil components were checked for deposition of plating. The number of components with an unplated area of 50% or more of the laser-irradiated region was counted as "unplated." Table 2 shows the results.

Deposition Rate (Plating Deposition Rate)

The cross sections of the coil components were polished, and the thicknesses were measured at five points with a fluorescent X-ray film thickness gauge (SFT3500 manufactured by Seiko Instruments Inc.). The average of the thicknesses was divided by the plating time to calculate the deposition rate. Table 2 lists the average values of ten of the coil components for each radiation energy.

TABLE 2

| Sample No. | Radiation energy (J/mm$^2$) | Plating thickness (μm) | Deposition rate (μm) | Number of unplated components |
|---|---|---|---|---|
| *1 | 0 | 0.3 | $0.2 \times 10^{-2}$ | 100/100 |
| 2 | 0.25 | 6.2 | $3.4 \times 10^{-2}$ | 50/100 |
| 3 | 0.36 | 8.6 | $4.8 \times 10^{-2}$ | 10/100 |
| 4 | 0.46 | 9.9 | $5.5 \times 10^{-2}$ | 0/100 |
| 5 | 0.56 | 10.4 | $5.8 \times 10^{-2}$ | 0/100 |
| 6 | 0.68 | 10.7 | $5.9 \times 10^{-2}$ | 0/100 |

As is clear from Table 2, in the sample number 1 with no laser irradiation, all the coil components were unplated. By contrast, the number of unplated coil components decreased in the sample numbers 1 to 6 with laser irradiation. In particular, plating was good in all the coil components of the sample numbers 4 to 6. In particular, the deposition rate was also good in the sample numbers 5 and 6.

A coil component according to an embodiment of the present disclosure can be widely used as an inductor or another device in various applications.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:
   a magnetic body containing a metallic material and a resin material;
   a coil conductor embedded in the magnetic body, the coil conductor including
      an exposed portion at each of a plurality of ends of the coil conductor, a surface of the exposed portion being arranged to annularly surround a central axis of a conducting wire of the coil conductor, and
      a covered portion covered with an insulating substance disposed between the exposed portions; and
   a pair of outer electrodes, each electrically connected to a respective one of the ends of the coil conductor,
   the covered portion being disposed inside of the magnetic body at locations which are inward of respective faces of the magnetic body on which the outer electrodes are disposed.

2. The coil component according to claim 1, wherein the ends of the coil conductor protrude outwardly from the faces of the magnetic body on which the outer electrodes are disposed.

3. The coil component according to claim 1, wherein
   the surface of at least one of the ends of the coil conductor has an angle of less than approximately 90 degrees to the central axis of a conducting wire of the coil conductor;
   the exposed portion at the at least one of the ends has an average depth in a range of approximately 1 to 80 μm from one of faces of the magnetic body; and
   an average protrusion height at which the at least one of the ends protrudes outwardly from the one of the faces is in a range of approximately 0 to 80 μm.

4. The coil component according to claim 1, wherein the metallic material forms a network structure on the faces of the magnetic body on which the outer electrodes are disposed.

5. The coil component according to claim 1, wherein the faces of the magnetic body on which the outer electrodes are disposed are treated by laser irradiation.

6. The coil component according to claim 1, wherein the outer electrodes are monolayer or multilayer plating layers.

7. A coil component comprising:
   a magnetic body containing a metallic material and a resin material;
   a coil conductor embedded in the magnetic body, the coil conductor including
      an exposed portion at each of a plurality of ends of the coil conductor, and
      a covered portion covered with an insulating substance disposed between the exposed portions; and
   a pair of outer electrodes, each electrically connected to a respective one of the ends of the coil conductor,
   the covered portion being disposed inside of the magnetic body at locations which are inward of respective faces of the magnetic body on which the outer electrodes are disposed,
   wherein at least one of the ends of the coil conductor protrudes outwardly from one of the faces of the magnetic body at a first protrusion height from the one of the faces as measured at a first edge of the at least one of the ends that extends at an acute angle with respect to the one of the faces, and at a second protrusion height, different from the first protrusion height, from the one of the faces as measured at a second edge of the at least one of the ends that extends at an obtuse angle with respect to the one of the faces.

8. The coil component according to claim 7, wherein the first protrusion height is greater than the second protrusion height.

9. The coil component according to claim 1, wherein
the surface of at least one of the ends of the coil conductor has an angle of less than approximately 90 degrees to the central axis of a conducting wire of the coil conductor.

10. The coil component according to claim 1, wherein
the exposed portion at the at least one of the ends has an average depth in a range of approximately 1 to 80 µm from one of the faces of the magnetic body.

11. The coil component according to claim 1, wherein
an average protrusion height at which the at least one of the ends protrudes outwardly from one of the faces is in a range of approximately 0 to 80 µm.

12. The coil component according to claim 2, wherein
the surface of at least one of the ends of the coil conductor has an angle of less than approximately 90 degrees to the central axis of a conducting wire of the coil conductor;

the exposed portion at the at least one of the ends has an average depth in a range of approximately 1 to 80 µm from one of faces of the magnetic body; and an average protrusion height at which the at least one of the ends protrudes outwardly from the one of the faces is in a range of approximately 0 to 80 µm.

13. The coil component according to claim 2, wherein the metallic material forms a network structure on the faces of the magnetic body on which the outer electrodes are disposed.

14. The coil component according to claim 2, wherein the faces of the magnetic body on which the outer electrodes are disposed are treated by laser irradiation.

15. The coil component according to claim 2, wherein the outer electrodes are monolayer or multilayer plating layers.

\* \* \* \* \*